(12) United States Patent
Sawada (10) Patent No.: US 9,232,203 B2
(45) Date of Patent: *Jan. 5, 2016

(54) IMAGE PROCESSING DEVICE, IMAGING DEVICE, IMAGE PROCESSING METHOD, IMAGING METHOD, AND IMAGE PROCESSING PROGRAM FOR PSEUDO-COLOR SUPRESSION IN AN IMAGE

(71) Applicant: Intel Corporation, Santa Clara, CA (US)

(72) Inventor: Yasuhiro Sawada, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,651

(22) Filed: Sep. 19, 2013

(65) Prior Publication Data

US 2014/0022421 A1   Jan. 23, 2014

Related U.S. Application Data

(63) Continuation of application No. 13/357,284, filed on Jan. 24, 2012, now Pat. No. 8,542,299, which is a continuation of application No. 12/669,011, filed as application No. PCT/JP2008/062584 on Jul. 11, 2008, now Pat. No. 8,106,974.

(30) Foreign Application Priority Data

Jul. 13, 2007   (JP) ................................ 2007-184969

(51) Int. Cl.
*H04N 9/64* (2006.01)
*H04N 9/04* (2006.01)
*H04N 9/07* (2006.01)
*G06T 3/40* (2006.01)

(52) U.S. Cl.
CPC .............. *H04N 9/646* (2013.01); *G06T 3/4015* (2013.01); *H04N 9/045* (2013.01); *H04N 9/07* (2013.01); *H04N 2209/046* (2013.01)

(58) Field of Classification Search
CPC ......... H04N 9/045; H04N 9/07; H04N 9/646; H04N 2209/046; G06T 3/4015
USPC .......... 348/241, 242, 272, 273, 280; 382/162, 382/163, 167
See application file for complete search history.

(56) References Cited

U.S. PATENT DOCUMENTS 6,958,772 B1 * 10/2005 Sugimori ................... 348/222.1
7,542,076 B2 * 6/2009 Sugimori ................... 348/223.1

(Continued)

*Primary Examiner* — Aung S Moe
(74) *Attorney, Agent, or Firm* — Leydig, Voit & Mayer, Ltd.

(57) ABSTRACT

An image processing device including a synchronization unit (25) for generating a luminance (Y') from the sum of pixel signals R, Gr, Gb, B, for subtracting the R pixel signal and the B pixel signal from the sum of the Gr pixel signal and Gb pixel signal so as to generate a first color difference (C1), and for calculating a difference between the R pixel signal and the B pixel signal to generate a second color difference (C2), a pseudo-color suppression unit (31) for performing pseudo-color suppression of the first color difference (C1) and/or the second color difference (C2), a color space conversion unit (37) for converting the luminance Y', the first color difference (C1), the second color difference (C2), into a predetermined color space to generate YUV color information.

11 Claims, 7 Drawing Sheets

(56) References Cited

U.S. PATENT DOCUMENTS 8,542,299 B2 * 9/2013 Sawada .................. 348/242
2009/0207275 A1 * 8/2009 Sugimori .................. 348/223.1
2010/0046859 A1 * 2/2010 Hitomi et al. .................. 382/300
2011/0115942 A1 * 5/2011 Kurita et al. .................. 348/223.1

* cited by examiner

IMAGE PROCESSING DEVICE, IMAGING DEVICE, IMAGE PROCESSING METHOD, IMAGING METHOD, AND IMAGE PROCESSING PROGRAM FOR PSEUDO-COLOR SUPRESSION IN AN IMAGE

CROSS-REFERENCE TO RELATED APPLICATIONS

This application is a continuation of U.S. patent application Ser. No. 13/357,284, filed Jan. 24, 2012, which is a continuation of Ser. No. 12/669,011, filed Jan. 13, 2010 (now U.S. Pat. No. 8,106,974, issued Jan. 31, 2012), which claims priority to International Application No. PCT/JP2008/062584, filed Jul. 11, 2008 and Japanese Application No. 2007-184969, filed Jul. 13, 2007, the contents of each listed application are expressly incorporated by reference in their entirety.

An image processing device, an imaging device, an image processing method, an imaging method, and an image processing program.

FIELD OF INVENTION

The present invention relates to a technology for an image processing device and an imaging device, equipped with a CCD having a RGB three primary colors Bayer color filter, with multiple photo-electric conversion elements (pixels) laid out in 2-dimensional manner, which provides especially good resolution, low pseudo-color and improved image quality.

BACKGROUND OF THE INVENTION

In traditional digital cameras, an image processing device and an image processing method is known having an imaging system wherein the photographed image goes through the lens, forms an image on the CCD where the subject image is photo electrically converted and an image signal is generated.

Next, with a single-chip CCD, an image processing device and an image processing method are known that in addition to a matrix having a plurality of photo electric conversion elements are further equipped with a color filter before it and the image data is generated after signal processing of each color pixel signal output through the color filter.

Also, in the image processing device, the color filter of the single-chip CCD is equipped with an R (red), G (green) and B (blue) 3-color Bayer array matrix for each of the photo electric conversion elements. A luminance signal and color difference signal for each unit is generated from the output signal (1 unit=1 R pixel, 2 G pixels, 1 B pixel for a total of 4 pixels) of this CCD, and a color image signal having all the color image pixels is generated from these signals (for an example see Patent Reference 1).

For example, in an image processing device equipped with the aforementioned single-chip imaging device, the R, Gr, Gb, B color signals are loaded after going through the Bayer array color filter equipped CCD (Charge Coupled Device) and then 4 pixels each of R, Gr, Gb and B are sampled and an image signal having the center pixel of the four pixels signal is generated.

In more detail, although each pixel of a single-chip CCD contains only the color information of a single color all the red (R), blue (B) and green (G) values for each pixel is necessary to display a color image. Due to this, in imaging processing that uses a single-chip CCD, a so-called demosaic process is performed based on the color mosaic image having only an R, G, or B components. The demosaic process is a process that generates a color image with each pixel having all the RGB constituents with the use of interpolation calculation on the lacking color luminance information gathered from the surrounding pixels of the corresponding color mosaic image pixels (which is called interpolation processing).

However, in image processing that uses a single-chip CCD, if only interpolation is performed then there is a danger of pseudo-color generation or loss of image resolution.

For example, as the sampling frequency of the R signal and B signal is only ½ that of the G signal, any sampling greater than fs/2 (Nyquist frequency) will be cut-off due to the sampling theorem. Also, the R signal and B single phases will, at fs/2, be out of alignment with each other.

Therefore, due to the aforementioned cut-off phase difference there is a problem of the pseudo-color (for example, formation of a stripe pattern not in the original photographed object) occurrence on both surfaces. Therefore, in order to prevent pseudo-color, there is a method in which an optical filter having a cut-off frequency of approximately fs/2 is placed between the lens and the CCD so that any light radiation greater than fs/2 is cut-off (for example, see Patent Reference 2).

Also, for the aforementioned color image processing device, there is a method of pseudo-color suppression in which, focusing on suppression of pseudo-color occurring at the image edge, the difference of the plurality of nearby pixel signals is compared and if this difference exceeds a pre-set specified value (threshold value) the pixel signal is suppressed, thus achieving pseudo-color suppression (for example, see Patent Reference 3).

Patent Reference 1: Tokukai 2000-287211 Bulletin
Patent Reference 2: Tokukai Hei 7-7733 Bulletin
Patent Reference 3: Tokukai Hei 11-308625 Bulletin

DISCLOSURE OF THE INVENTION

Problems to be Solved by the Invention

However, in the traditional manner, if an optical filter having a cut-off frequency of about fs/2 is placed between the lens and CCD, in addition to pseudo-color removal there was also the fear that correct signal constituents would also be cut off and image quality deteriorates.

Also, as in Patent Reference 3, with the method of suppressing pseudo-color by comparison of the difference of the plurality of nearby pixel signals near the edge, with the difference being within a pre-determined specified limit, there is the danger that color stripes that are not pseudo-color are mistakenly reduced resulting in a loss of color saturation.

Consequently, the present invention provides, with suppression of pseudo-color and no loss of resolution, an image processing device and an imaging device, an image processing method and an imaging method, and an image processing program for the purpose of obtaining a high-quality color image.

Means for Solving the Problems

In order to achieve the above stated purpose, an image processing device according to the invention wherein: said device generates a color image constituted of pixels each holding a plurality of color information from a color mosaic image formed from the R (red), Gr (green located next to R in the above noted one-way direction), Gb (green located next to B in the above noted one-way direction) and B (blue) output of a CCD having a Bayer color filter array. Wherein, at the pixel location in the above mentioned color image, a synchronization method for the above mentioned R, Gr, Gb and B as a single unit, a luminance is generated from the sum of the above mentioned R, Gr, Gb and B pixel signal, and by subtracting the above mentioned R pixel signal and B pixel signal from the sum of the abovementioned Gr pixel signal and Gb pixel signal a $1^{st}$ color difference is generated and, at the same time, the difference between the above mentioned R pixel signal and B pixel signal is calculated to generate a $2^{nd}$ color difference, a pseudo-color suppression method in which at least the pseudo-color of either the $1^{st}$ color difference or $2^{nd}$ color difference is suppressed, and the color space conversion method which generates the above mentioned color information from the determined color space conversion after the above mentioned luminance and pseudo-color suppression method of the $1^{st}$ and $2^{nd}$ color difference.

According to the invention, providing pseudo-color suppression without loss of resolution and high quality image, especially the effective suppression of pseudo-color from mistaken detection of high frequency constituents of luminance as a color difference through: at the pixel location in the above mentioned color image, a synchronization method for the above mentioned R, Gr, Gb and B as a single unit, a luminance is generated from the sum of the above mentioned R, Gr, Gb and B pixel signal, and by subtracting the above mentioned R pixel signal and B pixel signal from the sum of the above mentioned Gr pixel signal and Gb pixel signal a $1^{st}$ color difference is generated and, at the same time, the difference between the above mentioned R pixel signal and B pixel signal is calculated to generate a $2^{nd}$ color difference, a pseudo-color suppression method in which at least the pseudo-color of either the $1^{st}$ color difference or $2^{nd}$ color difference is suppressed, and the color space conversion method which generates the above mentioned color information from the determined color space conversion after the above mentioned luminance and pseudo-color suppression method of the $1^{st}$ and $2^{nd}$ color difference.

This application's inventor has identified that, in the color mosaic image as output from the CCD having a Bayer array color filter, the $1^{st}$ color difference pseudo-color expression is more in the oblique direction while the $2^{nd}$ color difference pseudo-color expression is more in the horizontal/vertical directions. Therefore, by generating the $1^{st}$ color difference and $2^{nd}$ color difference from the mosaic image and reducing this to a specified quantitative amount, a high quality color image can be obtained.

An image processing device according to the invention, as the above mentioned pseudo-color suppression information, a pseudo-color generation method from the generation of at least one parameter of the $1^{st}$ parameter or $2^{nd}$ parameter expressing the high frequency component amount of the luminance differing directions for which the pseudo-color signal in the $1^{st}$ color difference and $2^{nd}$ color difference are included can be suppressed well and precisely in accordance with these parameters.

An image processing device according to the invention, the above mentioned $2^{nd}$ parameter is the parameter expressing the difference between the above mentioned Gr pixel signal and Gb pixel signal and from this, in accordance with the Gr to Gb difference pseudo-color amount is calculated and the pseudo-color can be suppressed. In other words, when an image, including a stripe pattern having an fs/2 cyclic luminance in either the vertical or horizontal direction, is formed on a Bayer array CCD, the luminance of the image formed on the R pixels and/or B pixels is different and pseudo-color occurs. At this time, in the same manner the luminance of the Gr pixels and Gb pixels differs so this Gr to Gb difference can be used as the $2^{nd}$ parameter of the pseudo-color suppression information.

An image processing device according to the invention, the above mentioned pseudo-color suppression method suppresses the above mentioned $1^{st}$ color difference in accordance with the above mentioned $1^{st}$ parameter and suppresses the above mentioned $2^{nd}$ color difference in accordance with the $2^{nd}$ parameter and the pseudo-color in the $1^{st}$ color difference and the $2^{nd}$ color difference can be suppressed.

An image processing device according to the invention with a low frequency pass filter, the $1^{st}$ color difference and $2^{nd}$ color difference output from the above mentioned pseudo-color suppression method goes through the low frequency pass filter to remove high frequency noise so that color difference noise in the color image can be reduced resulting in a higher quality color image being generated.

An image processing device according to the invention with the above mentioned pseudo-color suppression method being a low frequency pass filter to remove the high frequency component of the $1^{st}$ color difference and the $2^{nd}$ color difference, the $1^{st}$ color difference and $2^{nd}$ color difference phase mismatch can be suppressed resulting in a higher quality color image being obtained.

Next, according to the invention, an imaging device equipped with an imaging optics system to introduce the subject image to the above mentioned CCD and an image processing device to generate, in accordance with the mosaic image signal output from the above mentioned CCD, a color image having a plurality of color information of each pixel.

According to the imaging device of the invention, as it is equipped with an image processing device, pseudo-color can be suppressed without degrading the resolution and a high quality color image obtained, especially effective is the suppression of pseudo-color generated from mistaken detection of the high frequency component of luminance as color difference.

Also, the imaging device according to the invention, is comprised so that on the incident light path forming the object image on the above mentioned CCD, on the above mentioned color image pixel array, equipped with an optical low pass filter for oblique direction luminance high frequency suppression with the cutoff of the aforementioned optical low pass filter being associated with the above mentioned color mosaic image pixel array direction, forming a quadrangle having a 45° angle with the origin point as its center on the above mentioned color mosaic image frequency space, with the inside of this quadrangle being the transmission band. Therefore, from this composition, the luminance high frequency in the pixel array oblique direction that appears in the $1^{st}$ color difference can be effectively suppressed and interdependently of the pseudo-color suppression method a further level of effective pseudo-color suppression can be accomplished.

Next, according to the invention, an imaging processing method wherein: there is an image processing method that generates a color image having all the plurality of color information for each pixel from a color mosaic image of the output from a Bayer array CCD with R (red) Gr (the green next to the above mentioned R in one direction of the pixel array), Gb (the green next to the B in the above mentioned one direction) and B (blue) pixels, and at the pixel position in the above mentioned color image with the above mentioned R, Gr, Gb and B pixels as a single unified unit plus there is a luminance (Y) generation step from the sum of the above mentioned R, Gr Gb and B pixel signals and a $1^{st}$ color difference step from subtracting the above mentioned R pixel signal and B pixel signal from the sum of the above mentioned Gr pixel signal and Gb pixel signal and a $2^{nd}$ color difference generation step from the calculation of the difference between the above mentioned R pixel signal and B pixel signal and a pseudo-color suppression step using the above mentioned luminance information and at least one of the $1^{st}$ color difference and $2^{nd}$ color difference with the $1^{st}$ color difference and $2^{nd}$ color difference from the output of the above mentioned pseudo-color suppression step being converted to a specified color space so as to generate the above mentioned color information.

In the image processing method according to the invention, R, Gr, Gb and B are unified into a single unit by correlating them with pixel positions in a color image, there is a luminance (Y') generation step with the sum of the pixel signals R, Gr, Gb, B, a $1^{st}$ col or difference generation step by subtracting the R pixel signal and the B pixel signal from the sum of the Gr pixel signal and Gb pixel signal, a $2^{nd}$ color difference generation step by calculation of the difference between the R pixel signal and the B pixel signal, a pseudo-color suppression step of at least one of either the $1^{st}$ color difference or the $2^{nd}$ color difference pseudo-color, a color space conversion step for generation of the above mentioned color information after conversion of the luminance and pseudo-color suppressed $1^{st}$ color difference, $2^{nd}$ color difference into a determined color space and, in the same manner as with the invention, providing pseudo-color suppression without loss of resolution and enabling a high quality color image, especially with the effective suppression of pseudo-color from the CCD output pixel signal.

The image processing method according to the invention, as the pseudo-color suppression method is comprised so as to use a pseudo-color information generation step that generates at least one of either the $1^{st}$ parameter or $2^{nd}$ parameter, which express the high frequency component of the luminance differing directions, as the above mentioned pseudo-color information. And, the pseudo-color signal component included in the $1^{st}$ color difference and the $2^{nd}$ color difference can be well and precisely suppressed in accordance with these parameters.

The image processing method according the invention, as the above mentioned $2^{nd}$ parameter is the parameter expressing the difference of the above mentioned Gr pixel signal and Gb pixel signal pseudo-color can be suppressed, by calculation of the pseudo-color amount in accordance with the Gr and Gb difference.

In the image processing method according the invention, in the above mentioned pseudo-color suppression step, as the $1^{st}$ color difference is suppressed in accordance with the $1^{st}$ parameter and the $2^{nd}$ color difference is suppressed in accordance with the $2^{nd}$ parameter, the pseudo-color in the $1^{st}$ color difference and $2^{nd}$ color difference can be suppressed.

The image processing method according to the invention, uses a low frequency pass filter to remove the high frequency component of the above mentioned pseudo-color suppression step's $1^{st}$ color difference and $2^{nd}$ color difference output so the color difference noise in the color image can be decreased resulting in the generation of a further enhanced high quality image.

In the image processing method according to the invention, as a low frequency pass filter removes the high frequency component of the above mentioned pseudo-color suppression step's $1^{st}$ color difference and $2^{nd}$ color difference so the $1^{st}$ color difference and $2^{nd}$ color difference phase mismatch can be suppressed and a high quality color image obtained.

Next, the invention includes an imaging method wherein: imaging processing is performed using an imaging optics system to introduce the subject image to the above mentioned CCD and generating a color image having a plurality of color information for each pixel in accordance with the color mosaic image signal output from the above mentioned CCD, with the above mentioned image processing method.

According to the imaging method of the invention, pseudo-color can be suppressed without the loss of resolution, and a high quality color image obtained. Especially, the effective suppression of pseudo-color arising from mistaken detection of high frequency constituents of luminance as a color difference can be achieved.

As the imaging method of the invention is comprised so that on the incident light path forming the object image on the above mentioned CCD, on the above mentioned color image pixel array, there is an optical low pass filter for oblique direction luminance high frequency suppression with the cut-off of the aforementioned optical low pass filter being associated with the above mentioned color mosaic image pixel array direction, forming a quadrangle having a 45° angle with the origin point as its center on the above mentioned color mosaic image frequency space, with the inside of this quadrangle being the transmission band. Therefore, the luminance high frequency in the pixel array oblique direction that appears in the $1^{st}$ color difference pseudo-color can be effectively suppressed and interdependently of the pseudo-color suppression method a further level of effective pseudo-color suppression can be accomplished.

Next, according to the invention, an image processing program that generates a color image having all the plurality of color information for each pixel from a color mosaic image of the output from a Bayer array CCD with R (red) Gr (the green next to the above mentioned R in one direction of the pixel array), Gb (the green next to the B in the above mentioned one direction) and B (blue) pixels, and at the pixel position in the above mentioned color image with the above mentioned R, Gr, Gb and B pixels as a single unified unit, there is a luminance (Y) generation step from the sum of the above mentioned R, Gr Gb and B pixel signals and a $1^{st}$ color difference step from subtracting the above mentioned R pixel signal and B pixel signal from the sum of the above mentioned Gr pixel signal and Gb pixel signal and a $2^{nd}$ color difference generation step from the calculation of the difference between the above mentioned R pixel signal and B pixel signal and a pseudo-color suppression step using at least one of the above mentioned luminance information or $1^{st}$ color difference and $2^{nd}$ color difference with the $1^{st}$ color difference and $2^{nd}$ color difference from the output of the above mentioned pseudo-color suppression step being converted to a specified color space so as to generate the above mentioned color information being computer executed.

According to the image processing program of the invention, wherein: at the pixel position of the color image there is a luminance (Y) generation step, with R, Gr, Gb and B as a single unit, from the sum of the pixel signals R, Gr, Gb and B, and a $1^{st}$ color difference generation step from subtracting the above mentioned R pixel signal and B pixel signal from the sum of the above mentioned Gr pixel signal and Gb pixel signal and a $2^{nd}$ color difference generation step from the calculation of the difference between the above mentioned R pixel signal and B pixel signal and a pseudo-color suppression step using at least one of the above mentioned luminance information or $1^{st}$ color difference and $2^{nd}$ color difference with the luminance $1^{st}$ color difference and $2^{nd}$ color difference from the output of the above mentioned pseudo-color suppression step being converted to a specified color space so as to generate the above mentioned color information executed by computer so that, pseudo-color suppression without loss of resolution and high quality image can be achieved, especially the effective suppression of pseudo-color from mistaken detection of high frequency constituents of luminance as a color difference is possible.

In the image processing program of the invention, as the above mentioned pseudo-color information, there is a computer executed pseudo-color information generation step using at least the generation of one of the $1^{st}$ or $2^{nd}$ parameters which express the luminance differing directions high frequency constituent amount so that the pseudo-color signal component included in the $1^{st}$ color difference and the $2^{nd}$ color difference can be well and precisely suppressed in accordance with these parameters.

The image processing program of the invention, as the above mentioned $2^{nd}$ parameter is the parameter expressing the difference of the above mentioned Gr pixel signal and Gb pixel signal pseudo-color can be suppressed by calculation of the pseudo-color amount.

In the image processing program of the invention, in the above mentioned pseudo-color suppression step, the above mentioned $1^{st}$ color difference pseudo-color is suppressed in accordance with the above mentioned $1^{st}$ parameter and the above mentioned $2^{nd}$ color difference pseudo-color is suppressed in accordance with the above mentioned $2^{nd}$ parameter by computer execution and the pseudo-color included in the $1^{st}$ color difference and $2^{nd}$ color difference can be suppressed.

In the image processing program of the invention, the $1^{st}$ color difference and $2^{nd}$ color difference from the pseudo-color suppression step goes through the low-frequency pass filter to remove the high frequency component by computer execution and, the color difference noise in the color image can be decreased resulting in the generation of a further enhanced high quality image.

The image processing program of the invention, having the above mentioned pseudo-color suppression step wherein a low frequency pass filter is used to remove the high frequency component of the above mentioned $1^{st}$ color difference and the $2^{nd}$ color difference, executed by computer, the phase mismatch between the $1^{st}$ color difference and $2^{nd}$ color difference can be suppressed resulting in a higher quality color image being obtained.

Advantageous Effect of the Invention

An image processing device and an imaging device, an image processing method and an imaging method, and an image processing program of this invention can suppress pseudo-color without degrading the resolution and provide a high quality color image. With the use of the invention, R, Gr, Gb and B are unified into a single unit by correlating them with pixel positions in a color image, generating a luminance (Y') from the sum of the pixel signals R, Gr, Gb, B, subtracts the R pixel signal and the B pixel signal from the sum of the Gr pixel signal and Gb pixel signal so as to generate a $1^{st}$ color difference, and calculates a difference between the R pixel signal and the B pixel signal to generate a $2^{nd}$ color difference. Next, pseudo-color suppression of both the $1^{st}$ color difference and $2^{nd}$ color difference is performed. Subsequently, each of the luminance Y', the $1^{st}$ color difference, and the $2^{nd}$ color difference is converted into a predetermined color space to generate color information.

In the present invention, as the pseudo-color suppression information, through generation of the $1^{st}$ and $2^{nd}$ parameters, which express the luminance high frequency component amount, the pseudo-color signal component, in accordance with the $1^{st}$ parameter and $2^{nd}$ parameter, in the $1^{st}$ color difference and $2^{nd}$ color difference can be well and precisely suppressed.

In the present invention, as the $2^{nd}$ parameter is the parameter expressing the difference between the Gr pixel signal and the Gb pixel signal so the pseudo-color amount is calculated in accordance with the Gr to Gb difference and pseudo-color can be suppressed.

In the present invention, as the pseudo-color suppression method is comprised so that the $1^{st}$ color difference is suppressed in accordance with the $1^{st}$ parameter and the $2^{nd}$ color difference is suppressed in accordance with the $2^{nd}$ parameter, the pseudo-color in the $1^{st}$ color difference and $2^{nd}$ color difference can be suppressed.

In the present invention, the $1^{st}$ color difference and $2^{nd}$ color difference output from the pseudo-color suppression method goes through a low-frequency pass filter to remove high frequency noise resulting in color difference noise in the color image being decreased and the generation of a further enhanced high quality color image.

In the present invention, as the pseudo-color suppression method is to remove high frequency noise from the $1^{st}$ color difference and $2^{nd}$ color difference output with a low-frequency pass filter, the phase mismatch between the $1^{st}$ color difference and $2^{nd}$ color difference can be suppressed and a high quality color image obtained.

BRIEF DESCRIPTION OF THE FIGURES

FIG. 2 has explanatory drawings, in the same embodiment, with FIGS. 2 (a) and (b) explaining the optical filter pass bandwidth and FIG. 2 (c) explaining the resolution for pseudo-color suppression.

SYMBOLS EXPLANATION

1 . . . Imaging Device, 3 . . . Imaging Lens, 5 . . . CCD (Charge Coupled Devices), 5a . . . Bayer Array Color Filter, 6 . . . AFE (Analog Front End), 7 . . . CDS, 8 . . . AGC (Automatic Gain Control), 9 . . . A/D Conversion Unit 10 . . . Detection Unit, 11 . . . Sensor, 12 . . . Lens Drive Unit, 13 . . . TG (Timing Generator), 21 . . . Color Plane Decomposition Unit, 22 . . . R Field Memory, 23a . . . Gr Field Memory, 23b . . . Gb Field Memory, 24 . . . B Field Memory, 25 . . . Synchronization Unit, 26 . . . Luminance Y' Generation Unit, 27 . . . Oblique High Frequency Detection Unit, 28 . . . $1^{st}$ Color Difference Generation Unit, 29 . . . $2^{nd}$ Color Difference Generation Unit, 30 . . . Horizontal/Vertical High Frequency Detection Unit, 31 . . . Pseudo-color Suppression Unit, 32 . . . C1 Pseudo-color Removal Unit, 33 . . . C2 Pseudo-color Removal Unit, 34 . . . Low-Frequency Pass Filter, 37 . . . Color Space Conversion Unit (Color Matrix), 38 . . . CPU (Central Processing Unit), 39 . . . ROM (Read Only Memory), 100 . . . Image Processing Device

BEST EMBODIMENT FOR IMPLEMENTATION OF THE INVENTION

1st Embodiment

Next, we will explain, using the drawings, an embodiment of an image processing device and imaging device, an image processing method and an imaging method of this invention.

Figure 1:
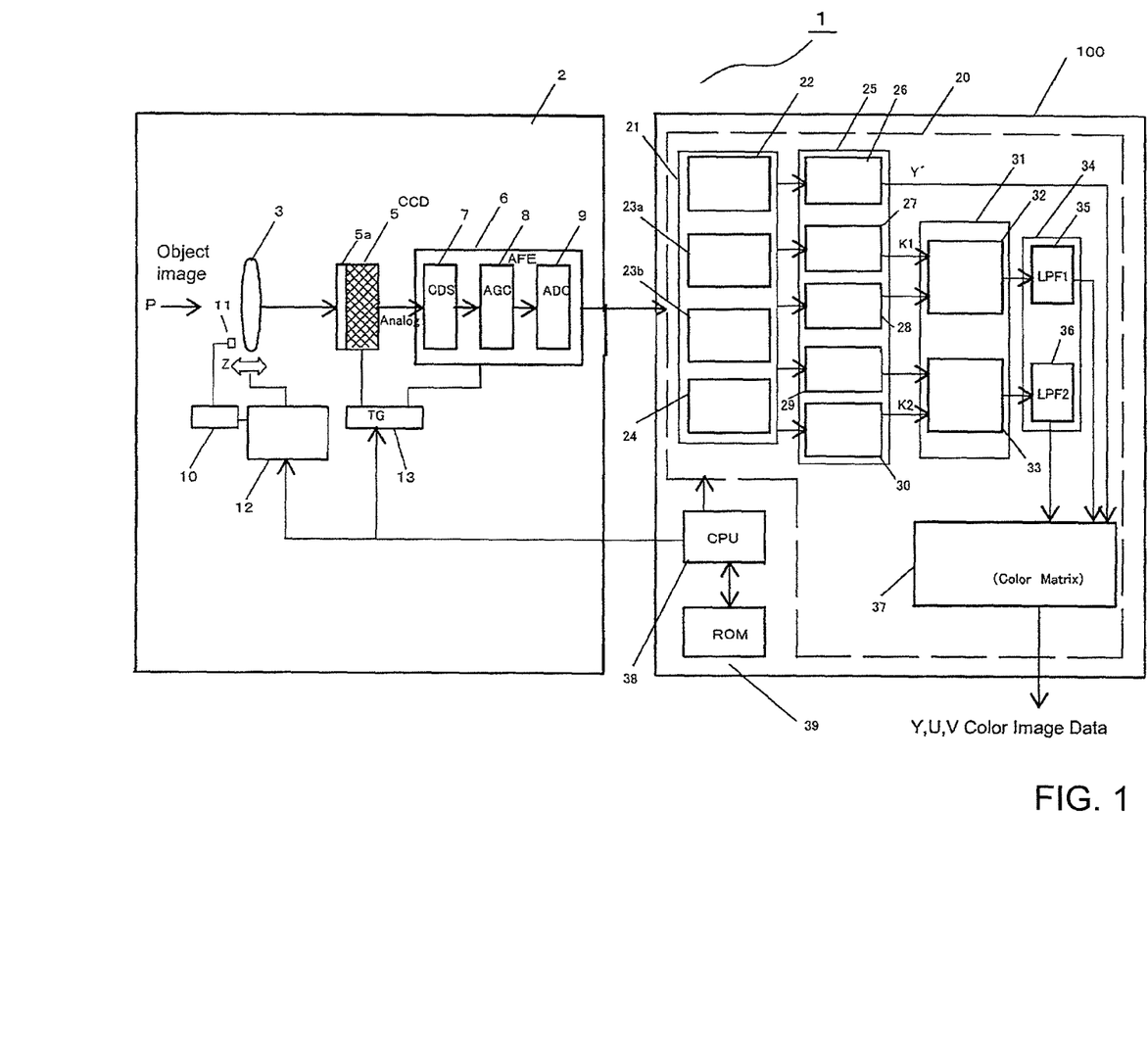
FIG. 1 is a block diagram expressing the structural composition of an imaging device of an embodiment of this invention.

FIG. 1 is a block diagram showing the configuration of the imaging device 1 of the present invention. As shown in FIG. 1, the imaging device is comprised of the digital image signal C (mosaic image signal) of the photographed subject image P from the output of the imaging optics systems 2 to the CCD 5 and, in accordance with the output digital signal C, an image processing device 100 that generates a color image having the plurality of color information of each pixel from the output of the imaging optics 2.

The image optics system 2 is equipped with such things as an image lens 3 which conveys the photographed subject image P to imaging elements 5 (CCD: Charged Coupled Devices) that converts the received photographed image light and outputs an electric amount, an AFE 6 (Analog Front End) which converts the analog image signal output from CCD 5 into a digital signal C for output, TG 13 (Timing Generator) which controls the CODS and AFE 6 at specific cycles, a lens drive unit 12 that slides the imaging lens 3 in the light axis direction (the Z direction in FIG. 3) and detection unit 10 which detects, via sensor 11, the imaging lens 3 slide amount.

CCD 5 is configured with its multiple photo electric conversion elements arrayed in a matrix condition and each photo electric conversion element converts its received image signal photo electrically into an analog image signal for output.

Also, for the photo electric conversion elements, CCD 5 is equipped with a 3-color R (red), G (green) and B (blue) Bayer array color filter 5a through which each color is filtered and the passed through light amount converted to an electric signal.

AFE 6 is comprised of such things as the CDS 7 (Correlated Double Sampling) 7 which removes the noise from the CCD 5 output analog image signal, AGC 8 which amplifies the correlated double sampling image signal from CDS 7, and an A/D Conversion Unit 9 which converts the analog image signal of CCD 5 (having gone through AGC 8) into a digital image signal. The image output signal of CCD 5 is converted to the digital image signal C, at the specified sampling frequency, and output to the image processing device 100.

Moreover, in the image optics system 2, in addition to CCD 5, CDS 7, AGC 8, and A/D Conversion Unit 9, a CMOS (Complementary Metal Oxide Semiconductor) sensor may also be used. As the pixel signal output from CCD 5 only has the single color information of each pixel what is output from the image optics system 2 to the image processing device 100 is the above noted mosaic image signal.

Next, the image processing device 100 is comprised of such things as the color plane decomposition unit 21 which takes the image optics system 2 output mosaic image and separates and stores it by each R, Gr, Gb, and B pixel, a synchronization unit 25 which generates the color information of the color image pixel position in accordance with the pixel signal output from the color plane decomposition unit 21, a pseudo-color suppression unit 31 which suppresses the pseudo-color of the synchronization unit 25 output pixel signal, a low pass filter 34 which removes the high frequency component of the pseudo-color suppression unit 31 output pixel signal, a color space conversion unit (color matrix) 37 which generates the color information by converting the specified color space of the image signal after it has gone through the low pass filter 34, a CPU (Central Processing Unit) 38 and ROM (Read Only Memory) 39. The CPU 38, in accordance with the control program stored in ROM 39, controls each process of the aforementioned image processing device 100 and imaging device 1.

The color plane decomposition unit 21, with the associated Bayer array, is comprised of the R field memory 22 which stores the R pixel signal to memory, the Gr Field Memory 23a which stores the Gr (the G next to the R in one direction) pixel signal to memory, the Gb Field Memory 23b which stores the Gb (the G next to the B in one direction) pixel signal to memory, and the B field memory 24 which stores the B pixel signal to memory. These pixel signals (hereinafter, pixel values) are output to synchronization unit 25 in accordance with the commands from CPU 38.

Figure 3:
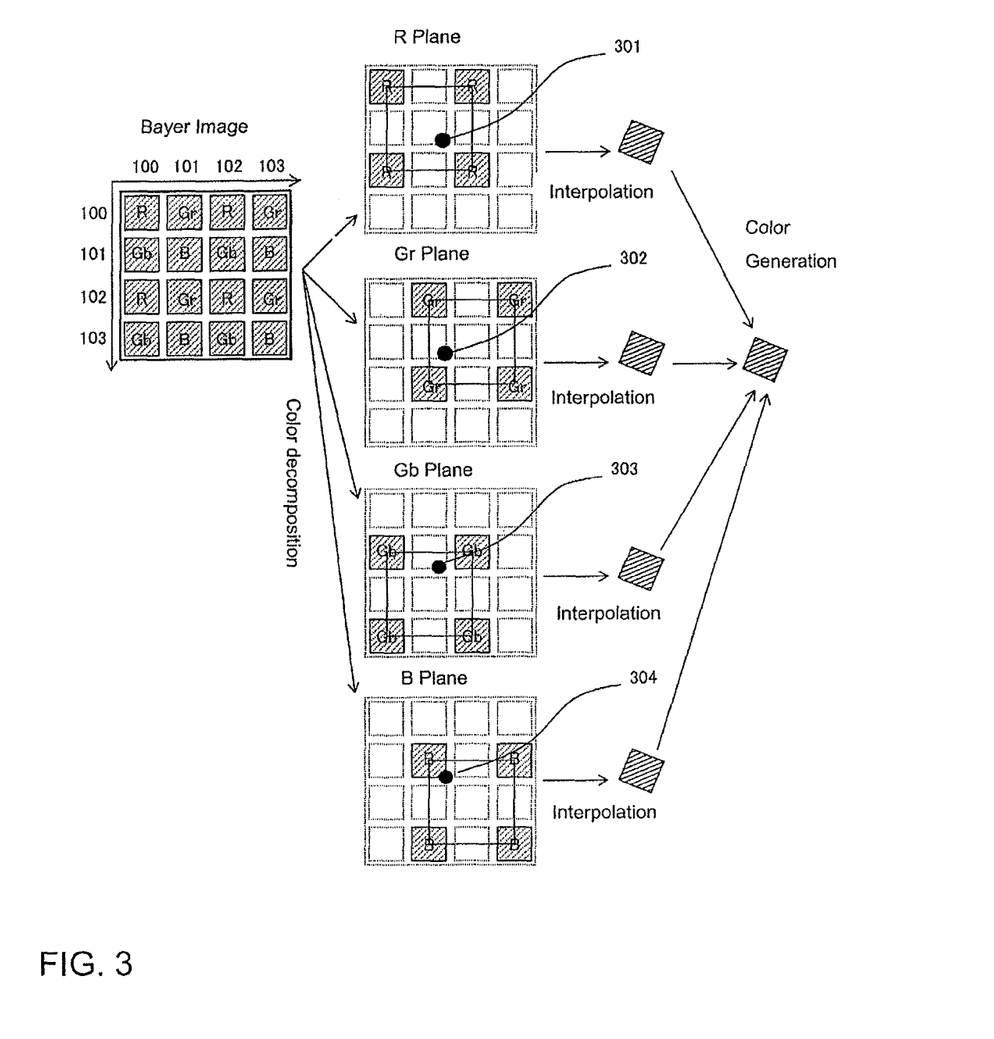
FIG. 3 is a diagram explaining, in the same embodiment example, the functions of the synchronization unit.

The synchronization unit 25, as expressed in FIG. 3, is set beforehand to do such things, for example, as color aberration correction, and for each of the multiple color planes, calculates, through interpolative operation of the same color light pixel value in the color plane, the pixel value at the sampling coordinates 301~304. Here, the sampling coordinates 301~304 is the location on the color mosaic image from the color image pixel location associated color space conversion unit (color matrix) 37.

Also, the synchronization unit 25 is comprised of the luminance Y' generation unit 26 which generates the luminance (Y') from the sum, with R, Gr, Gb and B as a single unit, of the R, Gr, Gb, B pixel values in accordance with the each color pixel value found by interpolative calculation at the color plane decomposition unit 21, the oblique high frequency detection unit 27 which detects luminance high frequency in the pixel array oblique direction, the $1^{st}$ color difference generation unit 28 which generates the $1^{st}$ color difference by subtracting the R pixel value and B pixel value from the sum of the Gr pixel value and Gb pixel value, the $2^{nd}$ color difference generation unit 29 which generates the $2^{nd}$ color difference by calculating the difference between the R pixel value and B pixel value and a horizontal/vertical high frequency detection unit 30 which detects luminance high frequency in the horizontal/vertical direction.

In detail, the synchronization unit 25, in accordance with the color mosaic image, calculates the luminance Y' of each pixel position of the output image using the arithmetic expression Y'=(R+Gr+Gb+B)/4, calculates the $1^{st}$ color difference C1 using the arithmetic expression C1=(Gr+Gb−R−B)/4, calculates the $2^{nd}$ color difference C2 using the arithmetic expression (R−B)/2 and calculates the $2^{nd}$ parameter K2 using the arithmetic expression (Gr−Gb)/2.

Figure 4:
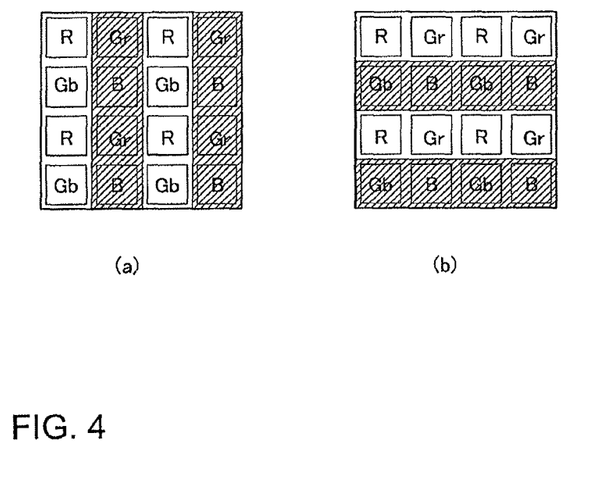
FIG. 4 is an explanatory drawing, in the same embodiment, showing the seeking of the $2^{nd}$ parameter K2 from the Gr and Gb color difference (Gr–Gb).

Here, as expressed in FIG. 4 (a)(b), if pseudo-color occurs in the $2^{nd}$ color difference C2 (in the Figure, pseudo-color is indicated by hatching), it can be thought that pseudo-color also occurs for the Gr to Gb color difference (Gr−Gb) so, the $2^{nd}$ parameter K2 can be sought using the above noted arithmetic expression.

Also, as regards parameter K1, a filter having a weighting factor (Formula 1) is applied to the color mosaic image and, after filter application, using the color plane of the color mosaic image the R and B interpolative value, as expressed in FIG. 3, is sought and using the R interpolative value and B interpolative value the value of K1 is found using the arithmetic expression K1=(R−B)/2.

[No. 1]

$$\begin{pmatrix} 1 & 0 & -2 & 0 & 1 \\ 0 & 0 & 0 & 0 & 0 \\ -2 & 0 & 4 & 0 & -2 \\ 0 & 0 & 0 & 0 & 0 \\ 1 & 0 & -2 & 0 & 1 \end{pmatrix} \Big/ 16 \qquad \text{Formula 1}$$

Also, when the output image pixel position is associated with each pixel position of the color mosaic image, by applying a filter to the color mosaic image the luminance (Y'), $1^{st}$ color difference C1, $2^{nd}$ color difference C2 and $2^{nd}$ parameter K2 can be obtained and by applying a filter (Formula 2) to the $1^{st}$ color difference C1 the $1^{st}$ parameter K1 can also be obtained.

[No. 2]

$$\begin{pmatrix} 1 & -2 & 1 \\ -2 & 4 & -2 \\ 1 & -2 & 1 \end{pmatrix} \Big/ 16 \qquad \text{Formula 2}$$

As noted above, the $1^{st}$ parameter K1 is the indicator expressing the pixel value change amount in the oblique direction having the pixel as its center, but it is not necessarily limited to (R−B), any pixel array with 45° interlacing in the oblique direction to the stripe pattern is acceptable. Also, at this time, if the image is one that does not have any change, K1 does not have a value even if the image has color so it is desirable that it does not have any value on the stripe pattern even in the horizontal/vertical direction and, furthermore, the filter should be comprised such that the high frequency 45° oblique direction stripe pattern value be a large value.

Next, such things as the luminance Y' generated by the luminance generation unit 26 is output to the color space conversion unit (color matrix) 37, the $1^{st}$ parameter K1 detected by the oblique high frequency detection unit 27, the $1^{st}$ color difference C1 generated by the $1^{st}$ color generation unit 28, the $2^{nd}$ color difference C2 generated by the $2^{nd}$ color generation unit 29, and the $2^{nd}$ parameter K2 detected by the horizontal/vertical high frequency detection unit 30 are output to the pseudo-color suppression unit 31. Moreover, the function of the synchronization method and the pseudo-color information generation method of the present invention is expressed by the synchronization unit 25.

The pseudo-color suppression unit 31 is comprised of the C1 pseudo-color removal unit 32 which suppresses the $1^{st}$ color difference C1 pseudo-color in accordance with the $1^{st}$ parameter K1 and $1^{st}$ color difference C1 input from the synchronization unit 25 and the C2 pseudo-color removal unit 33 which suppresses the $2^{nd}$ color difference C2 pseudo-color in accordance with the $2^{nd}$ parameter K2 and $2^{nd}$ color difference C2.

The C1 pseudo-color color removal unit 32 suppresses the $1^{st}$ color difference amount C1 generated by the synchronization unit 25 in accordance with the $1^{st}$ parameter K1 and the C2 pseudo-color color removal unit 33 suppresses the $2^{nd}$ color difference amount C2 generated by the synchronization unit 25 in accordance with the $2^{nd}$ parameter K2.

For example, using the formulas below, using the C1, C2 absolute values (as long as they do not bridge 0), all that needs to be done is to subtract the value obtained by multiplying the K1, K2 absolute values by the m1, m2 coefficients.

$C1 \rightarrow \text{sign}(C1)*\max((0, abs(C1)-m1*abs(K1))$ $C2 \rightarrow \text{sign}(C2)*\max((0, abs(C2)-m2*abs(K2))$ Here, m1, m2 are parameters for adjustment of pseudo-color suppression strength. The function of the pseudo-color suppression method of the present invention is expressed by the pseudo-color suppression unit 31.

Next, the low frequency pass filter 34 is comprised of the $1^{st}$ low frequency pass filter 35 which further suppresses the pseudo-color of the $1^{st}$ color difference C1 as output from the C1 pseudo-color color removal unit 32 and the $2^{nd}$ low frequency pass filter 36 which further suppresses the pseudo-color of the $2^{nd}$ color difference C2 as output from the C2 pseudo-color color removal unit 33.

As expressed in FIG. 2(c), the luminance Y' $1^{st}$ color difference C1 and $2^{nd}$ color difference C2 from synchronization unit 25 each have differing resolution boundaries with the C1 pass width being greater than the pass width of C2. Therefore, by using a LPF (low pass filter) for C1 that has a greater pass width than that of the one for C2, resolution deterioration can be lessened and effective pseudo-color suppression obtained.

For example, all that needs to be done is to apply a filter (Formula 3) to C1 and a filter (Formula 4) to C2.

[No. 3]

$$\begin{pmatrix} 0 & 1 & 0 \\ 1 & 0 & 1 \\ 0 & 1 & 0 \end{pmatrix} \Big/ 4 \qquad \text{Formula 3}$$

$$\begin{pmatrix} 1 & 0 & 1 \\ 0 & 0 & 0 \\ 1 & 0 & 1 \end{pmatrix} \Big/ 4 \qquad \text{Formula 4}$$

Or, by using a LPF for C1 that has a narrower pass width than that of C2 the frequency characteristics of C1 and C2 are aligned and an image without any unnaturalness can be made.

For example, one can apply a filter (Formula 5) to C1 and then apply the filter (Formula 6) to C2.

[No. 4]

$$\begin{pmatrix} 1 & 2 & 1 \\ 2 & 4 & 2 \\ 1 & 2 & 1 \end{pmatrix} \Big/ 16 \qquad \text{Formula 5}$$

$$\begin{pmatrix} 0 & 1 & 0 \\ 1 & 4 & 1 \\ 0 & 1 & 0 \end{pmatrix} \Big/ 8 \qquad \text{Formula 6}$$

Subsequently, the color space conversion unit (color matrix) 37 converts the luminance Y' from the synchronization unit 25, the $1^{st}$ color difference C1 and the $2^{nd}$ color difference C2 from the pseudo-color suppression unit 31 into a standard color image predetermined color space to generate YUV color information (Y=luminance, U and V are color information).

For example, the R pixel value component is sought in the R=Y'−C1+C2 arithmetic expression, the G pixel value component is sought in the G Y'+C1 arithmetic expression and the B pixel value component is sought in the B=Y'−C1−C2 arithmetic expression. Furthermore, using Formula 7, just convert the RGB to YUV color information.

[No. 5]

$$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix}. \quad \text{Formula 7}$$

Then, as in the above, for all the pixels in the color image, processing by the image processing device 100 is conducted and the YUV color information is output to the visual correction unit (not indicated in the drawings) in which known art image correction processes such as gamma correction, color saturation correction or edge emphasis are conducted.

2$^{nd}$ Embodiment

In the 1$^{st}$ embodiment, the pseudo-color of the 1$^{st}$ color difference C1 and 2$^{nd}$ color difference C2 was suppressed in the pseudo-color suppression unit 31 and then further suppressed by being sent through the low frequency pass filter 34. However, in the 2$^{nd}$ embodiment, the suppression of the 1$^{st}$ color difference C1 pseudo-color in the pseudo-color suppression unit 31 and the low frequency pass filter 34 is dropped and only the 2$^{nd}$ color difference C2 pseudo-color is suppressed. Also, as the basic composition of the imaging device 1 is common with that of the 1$^{st}$ embodiment, following below are details regarding only the distinguishing parts.

The 2$^{nd}$ embodiment imaging device 1 is equipped with an optical low pass filter (not indicated in the drawing) for removal of unwanted frequency space between the imaging lens 3 and CCD 5. The color mosaic image pixel signal from the image optics system 2 goes through the color plane decomposition unit 21 and is input to the synchronization unit 25.

Figure 2:
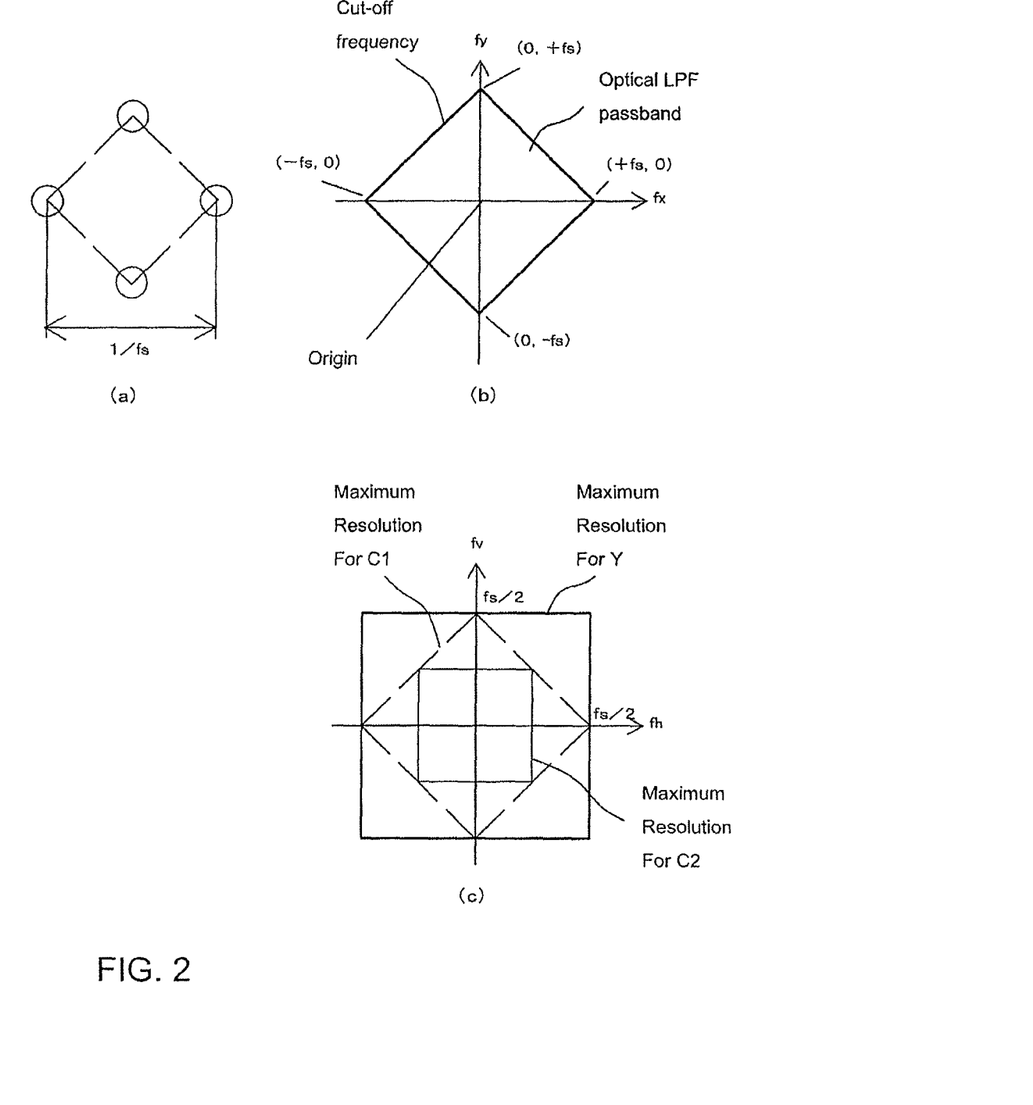

The cutoff of the above noted optical low pass filter, as expressed in FIG. 2 (a), (b), is associated with the pixel array direction of the later noted color mosaic image forming a quadrangle having a 45° oblique angle with the origin point as its center on the above mentioned color mosaic image frequency space, with the inside of this quadrangle being the transmission band. In detail, the optical low pass filter is a 4 point separate type, with the opposing point pixel pitch so as to become an even 1/fs, the light rays are separated to the 4 apexes of a square and the luminance high frequency, which is the origin of G (green) and violet pseudo-color, can be effective suppressed.

The synchronization unit 25, as expressed in FIG. 3, for each of the multiple color planes, calculates, through interpolative operation of the same color light pixel value in the color plane, the pixel value at the sampling coordinates 301~304.

Next, the synchronization unit 25, in accordance with the color mosaic image, calculates the luminance Y' of each pixel position of the output image using the arithmetic expression Y'=(R+Gr+Gb+B)/4, calculates the 1$^{st}$ color difference C1 using the arithmetic expression C1=(Gr+Gb−R−B)/4, calculates the 2$^{nd}$ color difference C2 using the arithmetic expression (R−B)/2 and calculates the 2$^{nd}$ parameter K2 using the arithmetic expression (Gr−Gb)/2.

Also, when the output image pixel position is associated with each pixel position of the color mosaic image, by applying a filter (Formula 8) through (Formula 11) to the color mosaic image the luminance (Y'), 1$^{st}$ color difference C1, 2$^{nd}$ color difference C2 and 2$^{nd}$ parameter K2 can be sought.

In detail, by applying the filter (Formula 8) to the color mosaic image formed from the R, Gr, Gb, B, the luminance Y' can be obtained.

[No. 6]

$$\begin{pmatrix} 1 & 2 & 1 \\ 2 & 4 & 2 \\ 1 & 2 & 1 \end{pmatrix} / 16 \quad \text{Formula 8}$$

Also, in the color mosaic image, the 1$^{st}$ color difference C1 value can be obtained by totaling the sums from the filtered output of the Gr and Gb pixels (Formula 9) and the R and B pixels.

[No. 7]

$$\begin{pmatrix} 1 & -2 & 1 \\ -2 & 4 & -2 \\ 1 & -2 & 1 \end{pmatrix} / 16 \quad \text{Formula 9}$$

$$\begin{pmatrix} -1 & 2 & -1 \\ 2 & -4 & 2 \\ -1 & 2 & -1 \end{pmatrix} / 16 \quad \text{Formula 10}$$

Also, in the color mosaic image, the 2$^{nd}$ color difference C2 value can be obtained by totaling the sums from the filtered output of the R pixels (Formula 11), the B pixels (Formula 12), the Gr pixels (Formula 13) and the Gb pixels (Formula 14).

[No. 8]

$$\begin{pmatrix} -1 & 0 & -1 \\ 0 & 4 & 0 \\ -1 & 0 & -1 \end{pmatrix} / 8 \quad \text{Formula 11}$$

$$\begin{pmatrix} 1 & 0 & 1 \\ 0 & -4 & 0 \\ 1 & 0 & 1 \end{pmatrix} / 8 \quad \text{Formula 12}$$

$$\begin{pmatrix} 0 & -2 & 0 \\ 2 & 0 & 2 \\ 0 & -2 & 0 \end{pmatrix} / 16 \quad \text{Formula 13}$$

$$\begin{pmatrix} 0 & 2 & 0 \\ -2 & 0 & -2 \\ 0 & 2 & 0 \end{pmatrix} / 16 \quad \text{Formula 14}$$

Also, in the color mosaic image, the 2$^{nd}$ parameter K2 value can be obtained by totaling the sums from the filtered output of the Gr pixels (Formula 15), the Gb pixels (Formula 16), the R pixels (Formula 17) and the B pixels (Formula 18).

[No. 9]

$$\begin{pmatrix} -1 & 0 & -1 \\ 0 & 4 & 0 \\ -1 & 0 & -1 \end{pmatrix} / 8 \quad \text{Formula 15}$$

-continued $$\begin{pmatrix} 1 & 0 & 1 \\ 0 & -4 & 0 \\ 1 & 0 & 1 \end{pmatrix} / 8 \quad \text{Formula 16}$$

$$\begin{pmatrix} 0 & -2 & 0 \\ 2 & 0 & 2 \\ 0 & -2 & 0 \end{pmatrix} / 16 \quad \text{Formula 17}$$

$$\begin{pmatrix} 0 & 2 & 0 \\ -2 & 0 & -2 \\ 0 & 2 & 0 \end{pmatrix} / 16 \quad \text{Formula 18}$$

As noted above, the $2^{nd}$ parameter K2 is the indicator expressing the pixel value change amount in the oblique direction having the pixel as its center, but it is not necessarily limited to (Gr−Gb), any pixel array with 45° interlacing in the oblique direction to the stripe pattern is acceptable. Also, at this time, if the image is one that does not have any change, K2 does not have a value even if the image has color so it is desirable that it does not have any value on the stripe pattern even in the horizontal/vertical direction and, furthermore, the filter should be comprised such that the cycle 2/fs horizontal/vertical direction stripe pattern value be a large value.

Next, the luminance Y' generated by the luminance Y' generation unit 26 and the $1^{st}$ color difference C1 generated by the $1^{st}$ color difference generation unit 28 is output to the color space conversion unit (color matrix) 37 and the $2^{nd}$ color difference C2 generated by the $2^{nd}$ color generation unit 29, and the $2^{nd}$ parameter K2 expressing the high frequency component detected by the horizontal/vertical high frequency detection unit 30 are output to the pseudo-color suppression unit 31.

Next, the pseudo-color suppression unit 31 suppresses the $2^{nd}$ color difference in accordance with the $2^{nd}$ parameter K2 and $2^{nd}$ color difference as input from the synchronization unit 25.

In other words, in the C2 pseudo-color color removal unit 33, the $2^{nd}$ color difference C2 amount generated at the synchronization unit 25 is suppressed in accordance with the $2^{nd}$ parameter K2.

For example, using the formula below, all that needs to be done is to subtract the K2 absolute value from the C2 absolute value (as long as it doesn't bridge 0).

$$C2 \rightarrow \text{sign}(C2)*\max((0, abs(C2)-m1*abs(K2))$$

Here, m1 is the parameter for adjustment of pseudo-color suppression strength.

Subsequently, the color space conversion unit (color matrix) 37 converts the luminance Y' from the synchronization unit 25, the $1^{st}$ color difference C1 and the $2^{nd}$ color difference C2 from the pseudo-color suppression unit 31 into a standard color image predetermined color space.

For example, for RGB color space conversion all that needs to be done is seek the R pixel value component with the R=Y'−C1+C2 arithmetic expression, the G pixel value component with the G=Y'+C1 arithmetic expression and the B pixel value component with the B=Y'−C1−C2 arithmetic expression. Subsequently, the RGB color information obtained from the color space conversion unit (color matrix) 37 is output to the visual correction unit (not indicated in the drawings) in which known art image correction processes such as gamma correction, color saturation correction or edge emphasis are conducted.

$3^{rd}$ Embodiment

Figure 5:
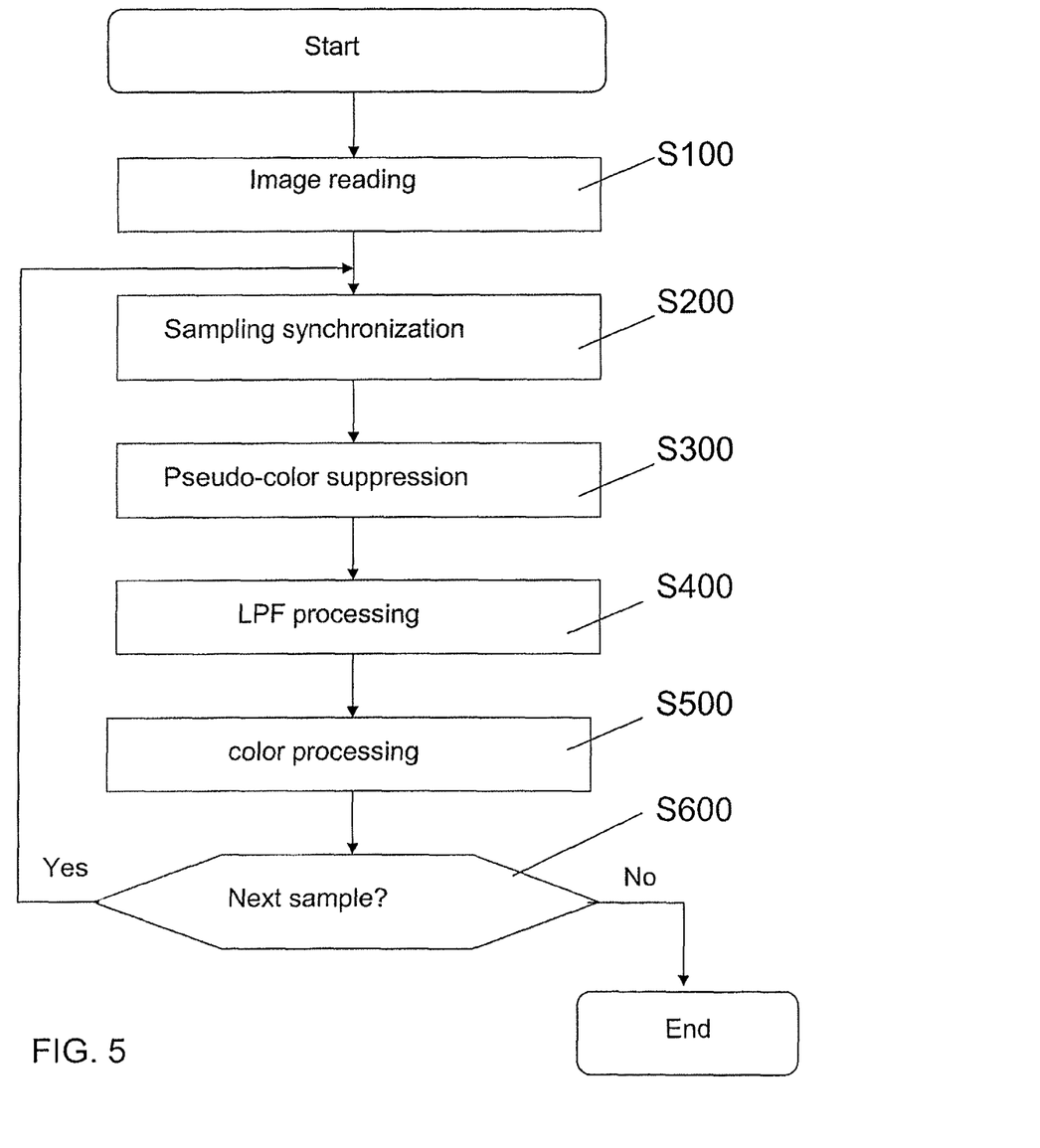
FIG. 5 is a flow chart, of the same embodiment, showing the procedure for an image processing method and an imaging method and an image processing program.
Figure 6:
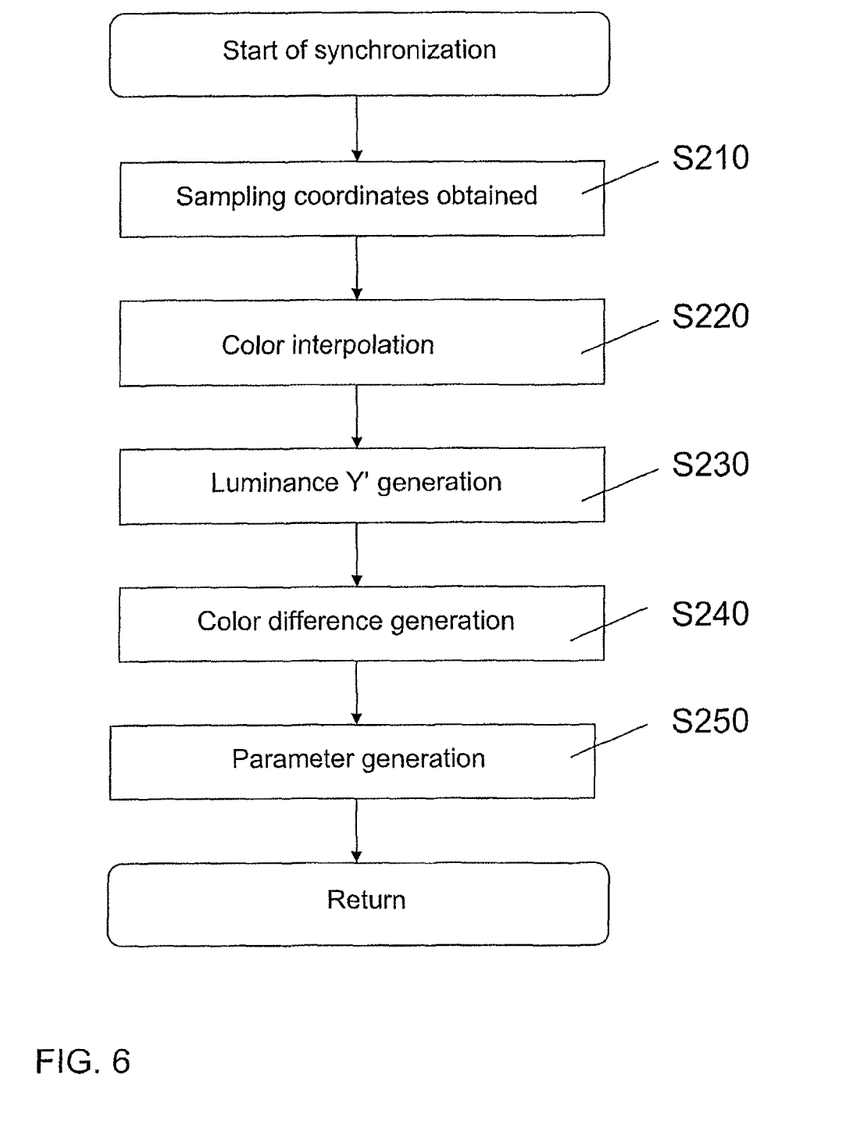
FIG. 6 is a flow chart showing the details of the synchronization procedure step in the FIG. 5 flow chart.
Figure 7:
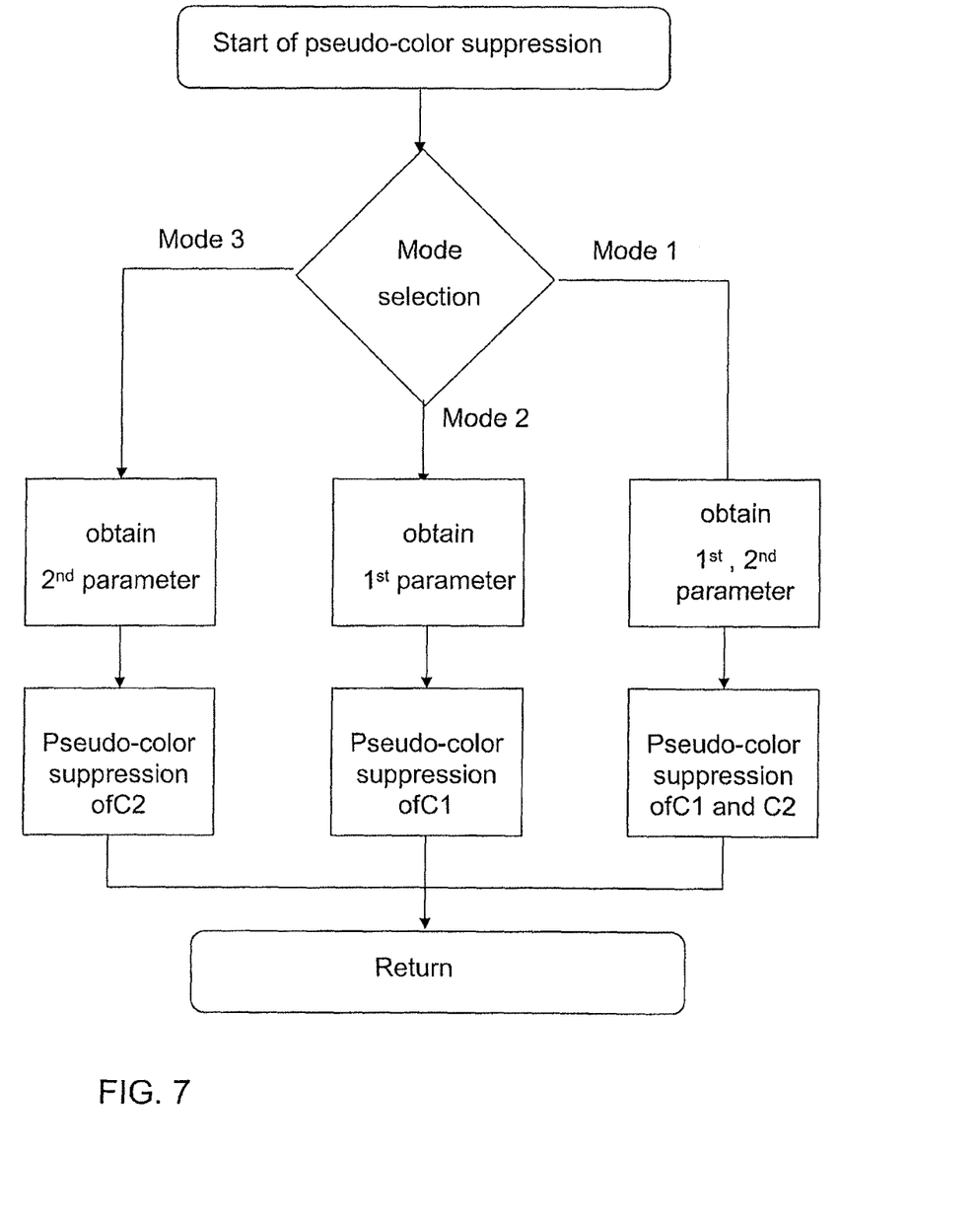
FIG. 7 is a flow chart showing the details of the pseudo-color suppression step in the FIG. 5 flow chart.

Next, using FIG. 5 to FIG. 7 we will explain the image processing method and image processing program procedure of an embodiment of this invention. This procedure, following the program stored to ROM 39 by CPU 38, executes the provision of the command signals to each function unit. Please note, the letter 'S' in FIG. 5 to FIG. 7 is an abbreviation of Step.

This image processing method and image processing program is applied to the image processing device 100 expressed in the $1^{st}$ embodiment and $2^{nd}$ embodiment.

First, this procedure begins when, through the operator, the start signal is input to the imaging device 1 or the image processing device 100.

Next, in S100, the image signal from the image optics system 2 is read in by the image processing device 100, Bayer array mapping is done at the color plane decomposition unit 21 and the R pixel signal, Gr pixel signal, Gb pixel signal and B pixel signal are recorded and then are sent to the S200 synchronization step.

In S200 as expressed in FIG. 6, first the sampling coordinates are obtained at S210 and then transferred to S220. At this time the sampling coordinates have the corresponding color image pixel position and they are preliminarily stored to ROM 39.

In S220, for each of the plurality of color planes, the pixel value in the sampling coordinates is calculated by interpolation from the same light color pixel value within the color plane and then goes to S230.

In S230, in accordance with each color pixel value sought by interpolation, with R, Gr, Gb and B as a single unit, a luminance (Y') is generated from the sum of the pixel signals R, Gr, Gb and then goes to S240. The function of the luminance generation step of the present invention is expressed by S230.

In S240, by subtracting the above mentioned R pixel signal and B pixel signal from the sum of the Gr pixel signal and Gb pixel signal a $1^{st}$ color difference C1 is generated and, at the same time, the difference between the R pixel signal and B pixel signal is calculated to generate a $2^{nd}$ color difference C2 and then sent to S250. The function of $1^{st}$ color difference generation step and $2^{nd}$ color difference generation step of the present invention is expressed by S240.

In 250, along the pixel array the luminance high frequency expressed in the oblique direction K1 and the luminance high frequency expressed in the horizontal/vertical direction K2 is detected and then sent to the S300 pseudo-color suppression step of FIG. 5. The function of the pseudo-color generation step of the present invention is expressed by S250.

In S300, as expressed in FIG. 7, first the pseudo-color suppression mode is selected in S310. The pseudo-color suppression mode is pre-determined with Mode 1 being both the $1^{st}$ color difference C1 and $2^{nd}$ color difference C2 pseudo-color suppression, Mode 2 being the $1^{st}$ color difference C1 pseudo-color suppression and Mode 3 being the $2^{nd}$ color difference C2 pseudo-color suppression. Also, the selection of Modes 1~3 is executed in accordance with command signal from the operator.

In S310, when Mode 1 is selected, as noted in the $1^{st}$ embodiment, upon transfer to S320 the $1^{st}$ parameter K1 and the $2^{nd}$ parameter K2 are obtained and then, in S330, the $1^{st}$ color difference C1 and $2^{nd}$ color difference C2 pseudo-color suppression is performed.

Alternatively, in S310, when Mode 2 is selected, upon transfer to S340 the $1^{st}$ parameter K1 is obtained and then, in S350 the $1^{st}$ color difference C1 pseudo-color suppression is performed. At this time, as noted in the $1^{st}$ embodiment, the $1^{st}$ color difference C1 pseudo-color suppression is performed.

Alternatively, in S310, when Mode 3 is selected, upon transfer to S360, as noted in the 2$^{nd}$ embodiment, the 2$^{nd}$ parameter K2 is sought and then, after transfer to S370 the 2$^{nd}$ color difference C2 pseudo-color suppression is performed. The function of the pseudo-color suppression step of the present invention is expressed by S310~S370.

Next, upon transfer to S400 of FIG. 5, a low-frequency pass filter 34 is used on the 1$^{st}$ color difference C1 and 2$^{nd}$ color difference C2 to remove the high frequency constituent and then transferred to S500.

In S500, luminance Y', pseudo-color suppressed 1$^{st}$ color difference C1 and 2$^{nd}$ color difference C2 are converted to a standard color image color space and the YUV color information of each pixel of the color image is generated and then transferred to S600.

In S600, a sampling determination is made and if sampling has not been done (No) the image processing program finishes and if sampling has been done (Yes) S200~S600 process is repeated over again and when no sampling is reached the image processing program finishes.

As in this embodiment noted above, it is possible to use an image processing device 100, an imaging device 1, an image processing method and an imaging method, and an image processing program which can effectively suppress pseudo-color without degrading the resolution and generate a high quality color image wherein: the R, Gr, Gb and B pixel signals are unified into a single unit by correlating them with pixel positions in a color image, a luminance (Y') is generated from the sum of the pixel signals R, Gr, Gb, and B, then the R pixel signal and the B pixel signal is subtracted from the sum of the Gr pixel signal and Gb pixel signal so as to generate a 1$^{st}$ color difference C1, and at the same time the difference between the R pixel signal and the B pixel signal is calculated to generate a 2$^{nd}$ color difference C2. Next, a pseudo-color suppression unit performs pseudo-color suppression of both the 1$^{st}$ color difference C1 and the 2$^{nd}$ color difference C2. Subsequently, a color space conversion unit converts the pseudo-colored suppressed 1$^{st}$ color difference C1 and 2$^{nd}$ color difference C2 into a predetermined color space to generate the color information.

In this embodiment, in the synchronization unit 25, by generation of the 1$^{st}$ parameter K1 and 2$^{nd}$ parameter K2 expressing the high frequency component amount in the oblique and horizontal/vertical directions the luminance of the 1$^{st}$ color difference C1 and 2$^{nd}$ color difference C2 included in the pseudo-color signal can be well and precisely suppressed.

In this embodiment, as the 2$^{nd}$ parameter K2 is the marker expressing the difference between the Gr pixel signal and the Gb pixel signal, the pseudo-color amount is calculated in accordance with the difference between Gr and Gb and pseudo-color can be suppressed.

In this embodiment, in the pseudo-color suppression unit 31, in accordance with the 1$^{st}$ parameter K1 and 1$^{st}$ color difference C1, the pseudo-color included in the 1$^{st}$ color difference C1 is suppressed and in accordance with the 2$^{nd}$ parameter K2 and 2$^{nd}$ color difference C2, the pseudo-color included in the 2$^{nd}$ color difference C2 can be suppressed.

In this embodiment, the output of the 1$^{st}$ color difference C1 and 2$^{nd}$ color difference C2 from the pseudo-color suppression unit 31, goes through the low-frequency pass filter 34 to remove high frequency noise and color difference noise in the color image can be decreased resulting in the obtaining of a further enhanced high quality image.

In the image processing program of this embodiment, as expressed in S310, a plurality of modes can be selected when suppressing pseudo-color and improvement of user-friendliness and convenience can be obtained.

As above we have explained one embodiment of this invention but this invention is not limited to just the above mentioned embodiment and it can take many different aspects.

For example, in S300, pseudo-color is suppressed and then, in S400 the low pass filtering (LPF) 34 is performed but it is also possible to do the low-pass filter process S400 before performing the S300 pseudo-color suppression. When so doing, it is preferred that the oblique high frequency and horizontal/vertical high frequency luminance detected by synchronization unit 25 also go through the low-pass filter process.

INDUSTRIAL APPLICABILITY

The 1$^{st}$ color difference and 2$^{nd}$ color difference are generated from the color mosaic image and it is possible to obtain a color image from them after a specified quantitative change.

The invention claimed is:

1. An apparatus, comprising:
   image processing circuitry to generate a color image from a color mosaic image, the color mosaic image comprising an array of red pixel, blue pixel, and green pixel luminance values, wherein to generate the color image the image processing circuitry to:
      determine first and second color differences based on at least a portion of the color mosaic image, wherein to determine the first color difference the image processing circuitry to subtract a combined sum of red pixel luminance values and of blue pixel luminance values of the portion from a sum of green pixel luminance values of the portion, wherein to determine the second color difference the image processing circuitry to determine a difference between a sum of red pixel luminance values and a sum of blue pixel luminance values of the portion;
      suppress pseudo-color in at least one of the first color difference or the second color difference to generate at least one of a pseudo-color suppressed first color difference or a pseudo-color suppressed second color difference; and
      perform color space conversion of at least one of the pseudo-color suppressed first color difference or the pseudo-color suppressed second color difference.

2. The apparatus of claim 1, wherein to suppress pseudo-color, the image processing circuitry to generate at least a one parameter corresponding to a high frequency luminance component in at least one of a first direction or a second direction different than the first direction.

3. The apparatus of claim 2, wherein the portion of the color mosaic image includes a red pixel, a blue pixel, a green-red pixel corresponding to a green pixel located adjacent to the red pixel in the first direction of the pixel array, and a green-blue pixel corresponding to a green pixel located adjacent to the blue pixel in the second direction, wherein to generate the first color difference the image processing circuitry to subtract the luminance values of the red pixel and blue pixel from a sum of the luminance values of the green-red pixel and the green-blue pixel, wherein to generate the second color difference the image processing circuitry to determine a difference between the red pixel and blue pixel luminance values, and wherein the at least one parameter corresponding to the high frequency luminance component comprises a difference between the green-red pixel and the green-blue pixel luminance values.

4. The apparatus of claim 1, further comprising a low pass filter to remove at least one high frequency component of the first color difference and of the second color difference.

5. The apparatus of claim 1, further comprising an image sensor to generate the color mosaic image.

6. The apparatus of claim 1, further comprising an image sensor to generate the color mosaic image; and imaging optics to image an object image on the image sensor.

7. The apparatus of claim 6, further comprising an optical low-pass filter arranged in an incident light path forming the object image on the image sensor.

8. A method, comprising:
    determining first and second color differences based on at least a portion of the color mosaic image, wherein determining the first color difference comprises subtracting a combined sum of red pixel luminance values and of blue pixel luminance values of the portion from a sum of green pixel luminance values of the portion, wherein determining the second color difference comprises determining a difference between a sum of red pixel luminance values and a sum of blue pixel luminance values of the portion;
    suppressing pseudo-color in at least one of the first color difference or the second color difference to generate at least one of a pseudo-color suppressed first color difference or a pseudo-color suppressed second color difference; and
    performing color space conversion of at least one of the pseudo-color suppressed first color difference or the pseudo-color suppressed second color difference.

9. The method of claim 8, wherein suppressing pseudo-color comprises generating at least a one parameter corresponding to a high frequency luminance component in at least one of a first direction or a second direction different than the first direction.

10. The method of claim 9, wherein the portion of the color mosaic image includes a red pixel, a blue pixel, a green-red pixel corresponding to a green pixel located adjacent to the red pixel in the first direction of the pixel array, and a green-blue pixel corresponding to a green pixel located adjacent to the blue pixel in the second direction, wherein determining the first color difference comprises subtracting the luminance values of the red pixel and blue pixel from a sum of the luminance values of the green-red pixel and the green-blue pixel, wherein determining the second color difference comprises determining a difference between the red pixel and blue pixel luminance values, and wherein the at least one parameter corresponding to the high frequency luminance component comprises a difference between the green-red pixel and the green-blue pixel luminance values.

11. The method of claim 8, further comprising removing at least one high frequency component of the first color difference and of the second color difference with a low pass filter.

* * * * *